United States Patent [19]

Vargiu et al.

[11] 4,029,865
[45] June 14, 1977

[54] PROCESS FOR THE POLYMERIZATION OF ETHYLENICALLY UNSATURATED ORGANIC COMPOUNDS

[75] Inventors: Silvio Vargiu, Casatenovo (Como); Volfango Gualandi, Macherio (Milan); Beppino Passalenti, Milan, all of Italy

[73] Assignee: Societa' Italiana Resine S.I.R. S.p.A., Milan, Italy

[22] Filed: Aug. 7, 1975

[21] Appl. No.: 602,834

[30] Foreign Application Priority Data

Sept. 10, 1974 Italy .................................. 27121/74

[52] U.S. Cl. .......................... 526/146; 252/431 R; 252/431 C; 260/31.2 R; 260/32.8 R; 260/33.2 R; 526/135; 526/145; 526/147; 526/317; 526/320

[51] Int. Cl.² ...................... C08F 2/06; C08F 4/40

[58] Field of Search .......... 526/135, 145, 146, 147, 526/343, 172; 260/31.2 R, 32.8 R, 33.2 R

[56] References Cited

UNITED STATES PATENTS

| | | | |
|---|---|---|---|
| 3,345,350 | 10/1967 | Shavit et al. | 526/192 |
| 3,860,568 | 1/1975 | Chabert et al. | 526/135 |

FOREIGN PATENTS OR APPLICATIONS

| | | | |
|---|---|---|---|
| 792,812 | 4/1958 | United Kingdom | 526/146 |

Primary Examiner—Edward J. Smith
Attorney, Agent, or Firm—Christie, Parker & Hale

[57] ABSTRACT

Vinylidene chloride polymers and copolymers are prepared by contacting vinylidene chloride monomer alone or in mixture with other ethylenically unsaturated monomers with a catalytic system consisting of an organic per-compound, an organic compound of zirconium or cobalt and an acid compound according to the definition of Bronsted and Lowry in an organic solvent medium.

High yields and polymerization speeds are achieved at low polymerization temperatures (10°–35° C).

26 Claims, No Drawings

PROCESS FOR THE POLYMERIZATION OF ETHYLENICALLY UNSATURATED ORGANIC COMPOUNDS

The present invention concerns the solution addition polymerization of ethylenically unsaturated monomers and in particular the polymerization in solution of vinylidene chloride and the copolymerization of same with one or more monomers ethylenically unsaturated, especially acrylonitrile, acrylic and methacrylic acids, alkyl esters and hydroxyalkyl esters of the acrylic and methacrylic acids.

The polymerization of ethylenically unsaturated monomers is usually carried out in the presence of a catalyst.

For this purpose, generally, catalysts which generate free radicals, such as benzoyl peroxide, potassium persulfate and alpha, alpha'-azodiisobutyronitrile, are used.

For this purpose are also known redox catalytic systems, such as persulfate/metabisulfite, persulfate/sulfoxylate, bromate/bisulfite, normally in the form of alkali metal salts, eventually activated or modified by means of acids, bases, sequestering or complexing agents, co-reducing agents and others.

In conventional polymerization processes of ethylenically unsaturated monomers, often are required reaction temperatures relatively high in order to ensure industrially useful polymerization speeds and the use of said high temperatures may lead to the attainment of polymers of poor quality.

On the other hand the use of lower temperatures determines generally unsatisfactory polymerization speeds and besides, low yields in polymers.

It has now been found that the use of a new and improved catalytic system may allow the polymerization and copolymerization of said ethylenically unsaturated monomers to be carried out at low temperatures and with high polymerization speeds, while allowing the abtainment of practically complete conversions of the said monomers into polymers endowed with improved physical properties.

The said catalytic system can be generally used for the solution polymerization of ethylenically unsaturated monomers having a $CH_2 = C<$ terminal group and is particularly useful for the polymerization of vinylidene chloride or the copolymerization of the latter with one or more other unsaturated monomers.

Therefore, an object of the present invention is a process for the polymerization of vinylidene chloride or the copolymerization of the latter with one or more other unsaturated monomers by means of a new catalytic system.

Thus, the present invention provides a process for the solution polymerization by addition of vinylidene chloride monomer or a mixture of the latter with one or more other ethylenically unsaturated monomers, characterized by contacting said monomer or mixture of monomers with a catalytic system consisting of an organic per-compound, an organic compound of zirconium or cobalt and an acid compound according to the definition of Bronsted and Lowry in an organic solvent medium in which the monomers, the catalytic system and the polymer or copolymer being formed are soluble.

The process of the present invention is generally applicable to these unsaturated monomers which present a $CH_2 32 C<$ terminal ethylenical unsaturation and is particularly useful for the polymerization of vinylidene chloride or for the copolymerization of this last with one or more unsaturated monomers chosen from: acrylonitrile, acrylic acid, methacrylic acid, alkyl esters of said acids, such as methyl, butyl, isobutyl and 2-ethylhexyl acrylates and methacrylates, and hydroxyalkylesters of said acids, such as 2-hydroxyethylacrylate and methacrylate and hydroxypropylmethacrylate. Vinylidene chloride can be present in any proportion in the mixture of monomers, the preferred amounts of said vinylidene chloride in the mixture being comprised between 100 and 30% by weight.

The polymerization can be carried out at a temperature equal or preferably lower than the boiling temperature of vinylidene chloride at atmospheric pressure.

Generally, the operations are performed at a temperature ranging from 10° to 35° C and preferably at 25°–30° C. Therefore the application of an overpressure in the environment where the polymerization occurs is not required.

As it has been said previously, the catalytic system dissolved in the reaction medium comprises an organic per-compound, an organic compound of zirconium or cobalt and an acid compound according to the Bronsted and Lowry definition.

Suitable organic per-compounds are those organic substances which generate free radicals under the operating conditions and which are soluble in the organic reaction medium, such as, for example, peroxides, hydroperoxides, peroxy-acids and peroxy-esters.

The organic per-compounds are generally present in amounts ranging from 0.01 to 10% by weight with respect to the total amount of monomers used, preferably from 0.5 to 3% by weight, and methylethylketone peroxide, benzoyl peroxide and tert-butyl hydroperoxide are particularly useful for the purpose.

It has been found that said per-compounds generate free radicals and allow a polymerization at low temperature and high velocity of the monomers ehtylenically unsaturated when they are used in combination with organic compounds of zirconium and cobalt soluble in the reaction medium.

Said organic compounds of zirconium and cobalt can be in the form of salts of aliphatic carboxylic acids (for example octoates), or salts or aromatic carboxylic acids (for example naphthenates), or in the form of complexes with organic substances (for example acetylacetonates). Said organic compounds are generally used for the purposes of the present invention in amounts ranging from 0.001 to 0.06 by weight (as metal) with respect to the total amount of monomers used.

Optimal results are obtained with the use of zirconium in the form of naphthenate or of octoate, especially in combination with tertiary-butyl hydroperoxide. The use of zirconium, besides affecting favourably the polymerization speed, permits of minimizing the undesired coloration phenomena of the resulting polymers.

In practice, as organic compounds, those compounds of cobalt and zirconium known as metallic soaps, of the type described by E. Singer, "Fundamentals of Paints, Varnish and Lacquer Technology", Ch. V - Driers, may be used.

The catalytic system of polymerization comprises also an acid substance, that is a substance capable of losing a proton, according to the definition of Bronsted and Lowry. These acids, described for example by S. Glasstone "Introduction to Electrochemistry" Ch. IX, Acids and Bases, increase the velocity of polymerization when they are used in amounts ranging generally from 0.005 to 5.0% by weight with respect to the total amount of monomers used.

Various organic and inorganic acids, such as, for example, formic, hydrochloric, nitric, acetic, phosphoric and sulfuric acid are useful for this purpose.

Optimal results, especially for what concerns the velocity of reaction and the degree of conversion of monomers, are obtained by the use of para-toluene-sulfonic acid in the preferred amounts ranging from 0.1 to 1.0% by weight with respect to the amounts of monomers used.

The polymerization is performed in an organic solvent medium, which is liquid under the operating conditions, in which the monomers, the related polymers and the catalytic system are soluble.

Ketones (such as: methylethylketone, methylisobutylketone, dimethylketone, diethylketone, and dibutylketone), ethylene glycol glycolic ethers (such as the ethyl, methyl, and butyl monoethers), acetic acid esters (such as methyl, ethyl and butyl acetates), diethylene glycol monoethers (such as methyl, ethyl and butyl monoethers) are suitable solvents for the purpose. Obviously, mixtures of these compounds may be used as solvent medium for polymerization.

The polymers or copolymers of vinylidene chloride obtained according to the process of the present invention, may be used in varnish formulas in the form of solutions of these polymers or copolymers in an organic solvent.

The solutions obtained at the end of the polymerization process of the present invention are directly useable for this purpose.

In the prior art, vinylidene chloride polymerization was performed, for example, in emulsion from which the polymer or copolymer was recovered by precipitation. Then, washing, drying and dissolution in a suitable solvent are performed.

Vinylidene chloride was also polymerized or copolymerized by the suspension technique or in pearls, thus obtaining polymers or copolymers with a good degree of purity, because of the presence of lower amounts of dispersing agents. However, even in this case it was expedient to resort to washing, centrifugation and drying before the dissolution in an organic solvent.

It is evident that the dissolution stage implies a loss of time and requires the use of suitable containers equipped with stirring means, with exchangers and eventually with refluxing condensers also, making the process more costly.

Under this aspect the polymerization in solution of the present invention afford remarkable advantages.

It has to be remarked also that the redox systems of the prior art are hydrosoluble and therefore hardly suitable for the polymerization of ethylenically unsaturated monomers in an organic solvent.

On the other side, said catalytic systems generally do not allow performing the polymerization in a range of temperatures of the order of 30°–35° C or less, with acceptable velocities and with satisfactory conversions of the monomers into the related polymers.

In the embodiment of the process of the present invention wherein para-toluenesulfonic acid is used, said acid may be neutralized at the end of the polymerization by means of the addition of a stoichiometric amount of an amine, for example triethylamine.

The salt thus formed constitutes a latent catalyst which is use brings forth a series of thermoreticulation reactions which may occur with polymers containing carboxylic, hydroxyl or etherified hydroxyl groups, for example when resins of the urea, melamine or short oil glycerophthalic type and their mixtures are used in combination with copolymers of the present invention having hydroxyl and/or carboxylic reactive groups.

Varnish formulas of this type, thermosetting when heated, present such characteristics that they can be used in the field of varnishes and inks.

Finally, the polymers and copolymers obtained according to the process of the present invention may be stabilized against light and heat degradation, by means of a series of compounds, among which are the known acceptors of hydrochloric acid, such as epoxy resins, epoxydized oils, glycidylphenyl ethers, phenoxypropylene oxide and others; ultraviolet light absorbing agents, such as dihydroxybenzophenone and its derivatives, benzotriazole and its derivatives; antioxidant agents, such as dialkyl phosphites, trialkyl phosphites and di-tert-butyl-para-cresol.

The following Examples, wherein the parts and the percentages are given by weight are illustrative of the invention.

EXAMPLE 1

A polymerization reactor, consisting of a Pyrex glass flask, equipped with stirrer, reflux condenser, thermometer and safety outlet relief supplied with a valve set at 0.05 atm., is used.

The air within the apparatus is removed by flushing it with nitrogen for 15 minutes, then, carrying on the operation at 18°–20° C, the following ingredients are introduced into the flask; methylethylketone 505 parts, methyl "Cellosolve" (R.T.M.) 68 parts, paratoluenesulfonic acid 3.36 parts, carbon tetrachloride 11.2 parts, and 410 parts of a monomer mixture consisting of 560 parts vinylidene chloride, 280 parts methyl acrylate, 112 parts acrylic acid and 168 parts butyl acrylate. The mass is stirred while the temperature is brought to 25° C and then 5.6 parts of a solution consisting of 56 parts of methylethylketone and of 0.56 parts of zirconium naphtenate (containing 12% of zirconium metal) are added, and subsequently 7.3 parts of a solution consisting of 17 parts of tertiary-butyl hydroperoxide and 56 parts of methyl Cellosolve are added. The exothermicity of the reaction is controlled by cooling, maintaining the temperature of the mass at 27°–30° C.

After 30 minutes from the addition of the tertiary-butyl hydroperoxide, the remainder of the monomer mixture and the remainder of the solutions of tertiary butyl hydroperoxide and of zirconium naphthenate are gradually fed in the relative amounts described before. The operation is carried on in this way for 5.5 hours and during the subsequent 2.5 hours, a solution consisting of 0.15 parts of zirconium naphthenate in 28 parts of methylethylketone and a solution consisting of 1.5 parts of tertiary-butyl hydroperoxide in 28 parts of methyl Cellosolve are added at the same time.

Finally the stirring is maintained for 3 hours at 27°–30° C.

The temperature of the solution thus obtained is then cautiously increased to 75°–80° C, with distillation of about 100 parts of the solvent and then 100 parts of fresh methylethylketone are added for the purpose of compensating for the one distilled.

Finally the solution, maintained under stirring, is cooled to about 25° C and neutralized with triethylamine in stoichiometric amount with respect to the paratoluenesulfonic acid used.

By operating in the way described, a conversion of monomers of about 99% is obtained.

The solution shows a satisfactory limpidity and presents a color 2 as measured on the Gardner scale, a viscosity, determined by a viscosimeter Holde-Ubbelhode, of 5,200 cps, with a content of dry residue of 59.85%.

EXAMPLE 2

By carrying out the operation as previously described in Example 1, a mixture of monomers consisting of: vinylidene chloride 560 parts, methyl acrylate 280 parts, hydroxypropylmethacrylate 112 parts, 2-ethylhexyl acrylate 152 parts, and acrylic acid 16 parts, is copolymerized in the presence of 4.5 parts of paratoluenesulfonic acid.

A conversion of 99% with respect to the monomers used is reached and the resulting solution presents a Gardner color of 2 and a viscosity of 4800 cps, with a content of dry residue of 60%.

EXAMPLE 3 (comparison)

The operations are carried out as in Example 2, with the only difference being that p-toluenesulfonic acid is not added.

A conversion of 16.8% with respect to the monomers used is obtained.

EXAMPLE 4

Operating as described in Example 1, a mixture of monomers consisting of vinylidene chloride 560 parts, methyl acrylate 280 parts, butyl acrylate 84 parts, acrylic acid 64 parts, hydroxypropylmethacrylate 56 parts and 2-ethylhexylacrylate 76 parts is copolymerized in the presence of 4 parts of p-toluenesulfonic acid.

A conversion of 97.5% with respect to the monomers used is reached and the resulting solution presents a viscosity of 5,100 cps, with a content of dry residue of 58.5% and a Garnder color of 2.

EXAMPLE 5

Operating as described in Example 1, a mixture consisting of: vinylidene chloride 560 parts, methyl acrylate 280 parts, butyl acrylate 112 parts, 2-ethylhexylacrylate 50.5 parts, hydroxypropylmethacrylate 37.5 parts and acrylic acid 80 parts is copolymerized in the presence of 3.5 parts of p-toluenesulfonic acid.

The resulting solution has a viscosity of 4950 cps, a content of dry residue of 59%, and a Gardner color between 1 and 2.

EXAMPLE 6

Operating as described in Example 1, a mixture of monomers consisting of: vinylidene chloride 560 parts, methylacrylate 280 parts, butylacrylate 56 parts, acrylic acid 48 parts, hydroxypropylmethacrylate 74.7 parts and 2-ethylhexyl acrylate 101.3 parts is copolymerized in the presence of 4 parts of p-toluenesulfonic acid.

A coversion of 98.5% with respect to the monomers used is reached. The resulting solution has a Gardner color between 1 and 2, a viscosity of 4860 cps and a dry residue content of 59%.

EXAMPLE 7

The polymerization is carried out according to the procedure of Example 1, using the monomers mixture of Example 2. Cobalt octoate is used instead of zirconium naphthenate. A conversion of 90.6% with respect to the monomers used is reached. The resulting solution presents a slightly opalescent aspect and a green coloration.

EXAMPLE 8 (comparison)

The procedure is as in Example 5, using copper naphthenate instead of zirconium naphthenate. A conversion of 59.2% with respect to the monomers used is reached.

EXAMPLE 9 (comparison)

The procedure is as in Example 5, using lead naphthenate instead of zirconium naphthenate. A conversion of 43% with respect to the monomers used is reached.

EXAMPLE 10 (comparison)

The procedure is as in Example 5, using cerium naphthenate instead of zirconium napththenate.

The solution is strongly heterogeneous on account of the presence of precipitated material.

EXAMPLE 11 (comparison)

The procedure is as in Example 5, using manganese naphthenate instead of zirconium naphthenate. The solution presents a color 3 on the Gardner scale, while the conversion is of 20% with respect to the monomers used.

EXAMPLE 12 (comparison)

The procedure is as in Example 5, using vanadium octoate instead of zirconium naphthenate.

A conversion of 75% with respect to the monomers used is reached and the solution is yellowish and cloudy.

We claim:

1. A method for the solution polymerization by addition of vinylidene chloride monomer or a mixture of the latter with one or more other ethylenically unsaturated monomers, which comprises contacting said monomer or mixture of monomers with a catalytic system consisting of an organic per-compound, an organic compound of zirconium and para-toluene acid sulfonic, in an organic solvent medium in which the monomers, the catalytic system and the polymer or copolymer being formed are soluble.

2. The method of claim 1, wherein said other monomers are selected in the group consisting of acrylonitrile, acrylic acid, methacrylic acid, alkyl esters of the acrylic and metacrylic acids and hydroxyalkyl esters of the acrylic and methacrylic acids.

3. The method of claim 1, wherein the polymerization temperature is from 10° to 35° C.

4. The method of claim 1, wherein the polymerization temperature is of 25°–30° C.

5. The method of claim 1, wherein the organic per-compound is selected in the group consisting of the organic peroxides, hydroperoxides, peroxy-acids and peroxy-esters.

6. The method of claim 1, wherein the organic per-compound is selected in the group consisting of methylethylketone peroxide, benzoyl peroxide and tert-butyl hydroperoxide.

7. The method of claim 1, wherein the organic per-compound is used in an amount of from 0.01 to 10% by weight with respect to the amount of monomers used.

8. The method of claim 7, wherein said amount of organic per-compound is from 0.5 to 3% by weight.

9. The method of claim 1, wherein the organic compound of zirconium is selected in the group consisting of the zirconium salts of aliphatic carboxylic acids and aromatic carboxylic acids and the complexes of zirconium with organic substances.

10. The method of claim 1, wherein the organic compound of zirconium is selected in the group consisting of the octoates, naphthenates and acetylacetonates of zirconium.

11. The method of claim 1, wherein the organic compound of zirconium is used in a quantity ensuring an amount of from 0.001 to 0.06% by weight of zirconium with respect to the amount of monomers used.

12. The method of claim 1, wherein para-toluenesulfonic acid is used in an amount of from 0.005 to 5% by weight with respect to the amount of monomers used.

13. The method of claim 1, wherein the organic solvent medium is selected in the group consisting of ketones, ethylene glycol glycolic ethers, acetic acid esters and diethylene glycol monoethers.

14. A method for the solution polymerization by addition of vinylidene chloride monomer or a mixture of the latter with one or more other ethylenically unsaturated monomers, which comprises contacting said monomer or mixture of monomers with a catalytic system consisting of an organic per-compound, an organic compound of cobalt and para-toluene sulfonic acid, in an organic solvent medium in which the monomers, the catalytic system and the polymer or copolymer being formed are soluble.

15. The method of claim 14, wherein said other monomers are selected in the group consisting of acrylonitrile, acrylic acid, methacrylic acid, alkyl esters of the acrylic and methacrylic acids and hydroxyalkyl esters of the acrylic and methacrylic acids.

16. The method of claim 14, wherein the polymerization temperature is from 10° to 35° C.

17. The method of claim 14, wherein the polymerization temperature is of 25°–30° C.

18. The method of claim 14, wherein the organic per-compound is selected in the group consisting of the organic peroxides, hydroperoxides, peroxy-acids and peroxy-esters.

19. The method of claim 14, wherein the organic per-compound is selected in the group consisting of methylethylketone peroxide, benzoyl peroxide and tert-butyl hydroperoxide.

20. The method of claim 14, wherein the organic per-compound is used in an amount of from 0.01 to 10% by weight with respect to the amount of monomers used.

21. The method of claim 20, wherein the said amount of organic per-compound is from 0.5 to 3% by weight.

22. The method of claim 14, wherein the organic compound of cobalt is selected in the group consisting of the salts of aliphatic carboxylic acids and aromatic carboxylic acids and the complexes of cobalt with organic substances.

23. The method of claim 14, wherein the organic compound of cobalt is selected in the group consisting of the octoates, naphthenates and acetylacetonates of cobalt.

24. The method of claim 14, wherein the organic compound of cobalt is used in a quanity ensuring an amount of from 0.001 to 0.06% by weight of cobalt with respect to the amount of monomers used.

25. The method of claim 14, wherein the para-toluene sulfonic acid is used in an amount of from 0.005 to 5% by weight with respect to the amount of monomers used.

26. The method of claim 14, wherein the organic solvent medium is selected in the group consisting of ketones, ethylene glycol glycolic ethers, acetic acid esters and diethylene glycol monoethers.

* * * * *

UNITED STATES PATENT AND TRADEMARK OFFICE
CERTIFICATE OF CORRECTION

PATENT NO. : 4,029,865
DATED : June 14, 1977
INVENTOR(S) : Silvio Vargiu et al.

It is certified that error appears in the above–identified patent and that said Letters Patent are hereby corrected as shown below:

Column 1, line 41, "abtainment" should read -- obtainment --; line 63, "Bronsted" should read -- Brönsted --. Column 2, line 4, "unsatured" should read -- unsaturated --; line 40, "ehtylenically" should read -- ethylenically --; line 46, "or" 2nd occurrence should be -of-; line 68, "Bronsted" should read -- Brönsted --. Column 3, line 42, "are" should read -- were --. Column 4, line 4, "is" should read -- in --; line 38, after the word flask ";" should be -- : --; line 49, "Cellosolve" should read -- "Cellosolve" --; line 64, "Cellosolve" should read -- "Cellosolve" --.

Column 5, line 16, "operation" should read -- operations --; line 46, "Garnder" should read -- Gardner --; line 67, "coversion" should read -- conversion --. Column 6, lines 52 and 53, "para-toluene acid sulfonic" should read -- para-toluene sulfonic acid --; line 64, "of" should read -- from --. Column 7, lines 24 and 25, "paratoluenesulfonic" should read -- para-toluene sulfonic --.

Signed and Sealed this

Fourteenth Day of February 1978

[SEAL]

Attest:

RUTH C. MASON
Attesting Officer

LUTRELLE F. PARKER
Acting Commissioner of Patents and Trademarks